United States Patent
Park

(10) Patent No.: US 6,522,426 B1
(45) Date of Patent: Feb. 18, 2003

(54) METHOD FOR PRINTING IDENTIFICATION CODES OF A SCANNING AND PRINTING SYSTEM

(75) Inventor: You-il Park, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/144,540

(22) Filed: Aug. 31, 1998

(30) Foreign Application Priority Data

Aug. 29, 1997 (KR) .............................. 97-42781

(51) Int. Cl.$^7$ ................................. G06K 1/00
(52) U.S. Cl. ..................... 358/1.9; 358/405; 358/471; 358/488
(58) Field of Search ................ 358/405, 488, 358/474, 471, 404, 444, 450, 468, 494, 498, 1.6, 1.12, 1.14, 1.9, 409, 464

(56) References Cited

U.S. PATENT DOCUMENTS

| | | | |
|---|---|---|---|
| 4,745,560 A | * | 5/1988 | Decker et al. ............... 364/519 |
| 5,008,552 A | * | 4/1991 | Kuramochi et al. ......... 235/454 |
| 5,434,404 A | * | 7/1995 | Liu et al. ..................... 235/475 |
| 5,682,227 A | * | 10/1997 | Taguchi et al. ............... 355/25 |
| 5,764,371 A | * | 6/1998 | Kawashima et al. ........ 358/405 |

* cited by examiner

Primary Examiner—Thomas D. Lee
(74) Attorney, Agent, or Firm—Robert E. Bushnell, Esq.

(57) ABSTRACT

When a document is scanned, an identification code indicating that the document has been scanned is printed at a predetermined position on the document in correspondence to a stored count value. When the document has been completely scanned, the count value is increased by 1, and the increased count value is stored again. Then, when a scanning function is selected again and the document is scanned, the identification code is printed at another predetermined position of the document corresponding to the newly stored count value. Thus, the printed positions of the identification codes are set to be varied in correspondence to the count value.

27 Claims, 7 Drawing Sheets

FIG. 5

CPLT  CPLT  CPLT  CPLT  CPLT  CPLT  CPLT  CPLT  CPLT  CPLT

METHOD FOR PRINTING IDENTIFICATION CODES OF A SCANNING AND PRINTING SYSTEM

CLAIM OF PRIORITY

This application makes reference to, incorporates the same herein, and claims all benefits accruing under 35 U.S.C. §119 from an application for METHOD FOR PRINTING IDENTIFICATION CODES OF A SCANNING AND PRINTING SYSTEM earlier filed in the Korean Industrial Property Office on the Aug. 29, 1997 and there duly assigned Serial No. 42781/1997.

BACKGROUND OF THE INVENTION

1. Technical Field

The present invention relates to a method for printing identification codes of a scanning and printing system (such as a multifunctional machine). More particularly, the method for printing identification codes is capable of easily checking whether or not a document is scanned in a machine including a scanning unit and a printing unit, such as a multifunctional machine, by varying the printed positions of the identification codes on the document according to accumulated scan times during which a scanning operation is performed.

In addition, the present invention relates to a stamp printing method for printing identification codes. The method is capable of easily checking whether or not a document is scanned by varying the shapes of the identification codes according to accumulated scan times during which a scanning operation is performed.

2. Related Art

Presently, development and increase in office automation facilities have produced a multifunctional machine in which the office automation facilities are integrally formed to perform the various functions at the same time. The multifunctional machine mainly includes two functions as follows.

The first function is its function as a structure in which office automation facilities required in an office environment (e.g., a facsimile, a duplicator, a printer, a scanner, and so on) are integrally formed. The second function is a more compound function created in association with a computer (generally, 'a personal computer' is used), which occupies an important position in an office environment. As aforementioned, the multifunctional machine has a structure in which a facsimile, a duplicator, a printer and a scanner are integrally formed.

On the other hand, a multifunctional machine having an automatic document feeding (ADF) function suffers from a problem in that, while a plurality of documents set in the ADF apparatus are successively fed into the multifunctional machine, some of the documents are overlapped and fed at the same time. As a result, the documents which are overlapped and fed at the same time may be skipped without being scanned. Moreover, users cannot recognize those skipped documents.

To overcome such a problem, a stamp method has been provided. According to the stamp method, when a document has been completely scanned, a predetermined identification code is printed on the document to indicate the completion of the scanning operation with the document. In other words, when a document is scanned by a machine including a scanning unit and a printing unit, a particular identification code is printed at a predetermined position on the scanned document to indicate that the document has been completely scanned. Typically the identification code is 'CPLT'. However, such a stamp method still suffers from several problems as follows.

First, the identification code is printed at a particular position on the document. Accordingly, when a document is repeatedly scanned, the identification code is repeatedly printed and overlapped at the same position (e.g., the right bottom position of the document). As a result, the user cannot recognize how many times the document is scanned. In addition, all documents may be scanned again because some of them have been skipped without being scanned during the first scanning process. In this case, the identification code is printed in overlapped fashion on the previously printed identification code of the documents that have been scanned during the first scanning, and the identification code is printed for the first time on the documents that have been skipped without being scanned during the first scanning. Moreover, the identification code is included in the documents which have been scanned during the first scanning but not scanned during the second scanning. As a result, the user cannot recognize which documents are skipped during the second scanning.

SUMMARY OF THE INVENTION

Therefore, it is an object of the present invention to provide a stamp printing method which allows an easy check as to whether or not a document is scanned by varying the printed position of an identification code according to the accumulated number of times that a scanning operation is performed when the identification code is printed on the document while the document is scanned by a machine including a scanning unit and a printing unit.

It is another object of the present invention to provide a stamp printing method which allows an easy check as to whether or not a document is scanned by varying the shape of an identification code according to the accumulated number of times that a scanning operation is performed when the identification code is printed on the document while the document is scanned by a machine including a scanning unit and a printing unit.

According to an aspect of the present invention, when the top of a document is sensed, data recorded on the document begins to be scanned while the document is being transferred per predetermined unit. When the bottom of the document is sensed, an identification code printed position at which an identification code corresponding to a stored counting value is to be printed is detected. The identification code is then printed at the identification code printed position. In addition, when the document has completed the scanning operation, the counting value is increased by a predetermined value and stored.

According to another aspect of the present invention, when the top of a document is sensed, data recorded on the document begins to be scanned while the document is being transferred per predetermined unit. When the bottom of the document is sensed, an identification code printed position at which an identification code corresponding to a stored counting value is to be printed is detected, and the number of times that a scanning operation is performed in correspondence to the stored counting value is detected. The number of times that a scanning operation is performed is then printed on the identification code printed position. For example, the document may be transferred per unit of line.

Preferably, the identification code is firstly printed on the left side of the bottom of the document, and then the identification code is printed at a predetermined interval from the first printed identification code toward the right side of the bottom of the document as the counting value is increased by the predetermined value (e.g., by one).

Preferably, the predetermined interval is determined based on the consideration that the identification codes are not overlapped when a plurality of the identification codes are printed on the document.

Selectively, when the identification code printed position arrives at the right side of the bottom of the document, the counting value is initialized so that the identification code printed position is set to restart at the left side of the bottom of the document.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 illustrates identification codes printed by the multifunctional machine of FIG. 4;

DETAILED DESCRIPTION OF THE PREFERRED EMBODIMENTS

The objects, characteristics and advantages of the above-described invention will be more clearly understood through the preferable embodiments referring to the attached drawings.

As the terms mentioned later are determined based upon the function of the present invention, and they can be changed according to the technician's intention or a usual practice, the terms should be determined considering the overall contents of the specification of the present invention.

Figure 1:
FIG. 1 illustrates identification codes printed at the same position on a document by a stamp printing method.

FIG. 1 illustrates identification code printed at the same position on a document by a stamp printing method. According to the latter method, when the document is repeatedly scanned, the identification code is repeatedly printed in overlapping fashion at the same position (e.g., bottom right) on the document. As a result, a user cannot determine how many times the document is scanned.

Figure 2:
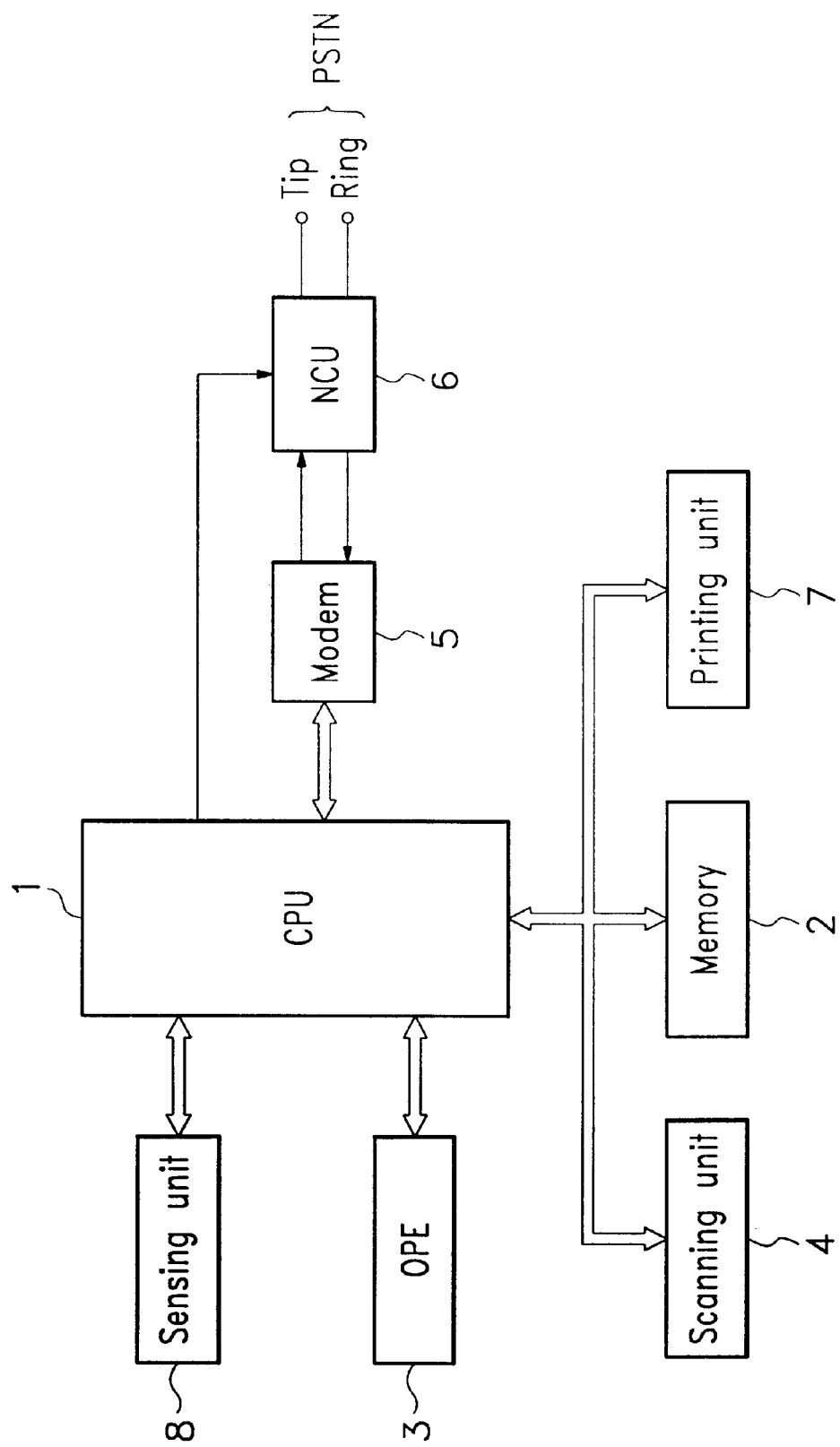
FIG. 2 is a schematic block diagram of a facsimile, as an example of a multifunctional machine to which the present invention is applied.

FIG. 2 is a schematic block diagram of a facsimile, as an example of a multifunctional machine to which the present invention is applied.

As shown in FIG. 2, the facsimile includes: a central processing unit (CPU) 1 for generally controlling the facsmilie according to a predetermined program; a memory 2 in which program data, protocol data, character data, work contents related to transmission/reception, the number of times that an identification code is printed and information of printing positions are stored, the stored data being accessed under control of the CPU 1; an operational panel (OPE) 3 including a plurality of function keys for generating key data for the facsimile, and a displaying device for inputting the key data into the CPU 1 and for displaying display data of the CPU 1; a scanning unit 4 for scanning data recorded on a document, converting the scanned data into digital image data, and supplying the CPU 1 with the digital image data; a modem 5 for modulating output data of the CPU 1 into analog data, and for demodulating analog input signals under control of the CPU 1; a network control unit (NCU) 6 for forming a communication loop for a public switching telephone network (PSTN), consisting of ring and tip, by operating under control of the CPU 1, and for interfacing signals between the modem 5 and the PSTN; a printing unit 7 for printing received fax data according to a control signal from the CPU 1; and a sensing unit 8, including a plurality of sensors, for sensing a residual amount of recordable medium or the document, and supplying the CPU 1 with the sensed result.

The above-described: components are mostly the same as those of a general facsimile. Accordingly, only some of the essential components will be described, and the descriptions of other components will be omitted below.

Figure 3A:
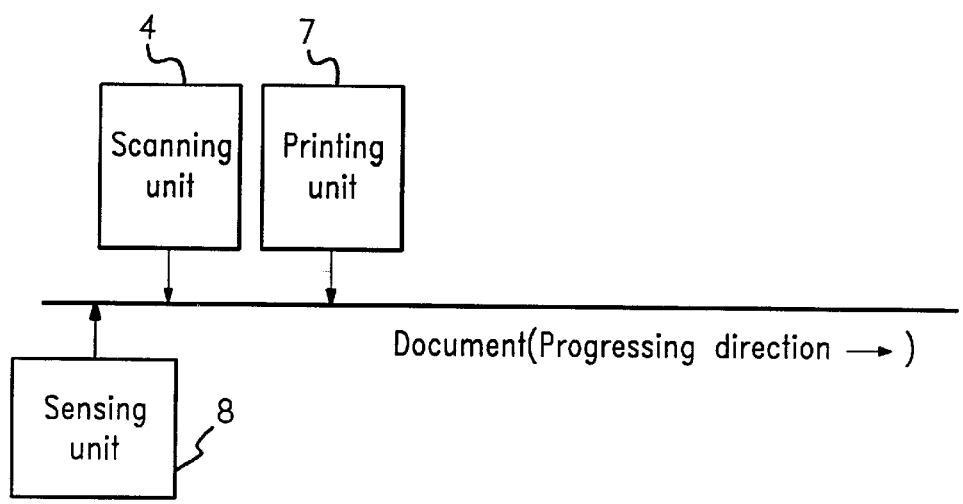
FIGS. 3A and 3B illustrate a scanning area, a printing area and a sensing area of a scanning position sensor when a document is transferred in a predetermined direction.
Figure 3B:
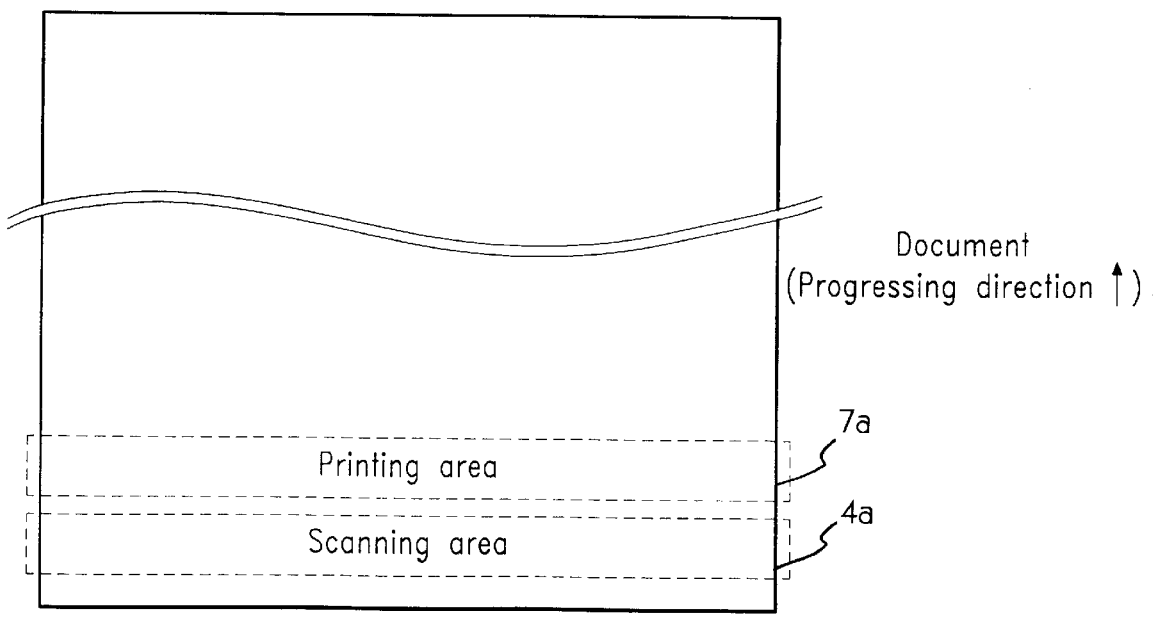

As shown in FIGS. 3A and 3B, when a document is transferred in a predetermined direction, the scanning and printing areas 4a and 7a, respectively, are adjacent to each other. The scanning area 4a is firstly scanned by the scanning unit 4, and the scanned result is printed in the printing area 7a by the printing unit 7. The point in time at which the document begins to be scanned is defined by a scanning position sensor or sensing unit 8 which senses that the document arrives at the scanning area 4a. The operation of the present invention having such a structure will be described with reference to FIGS. 4 thru 7.

Figure 4:
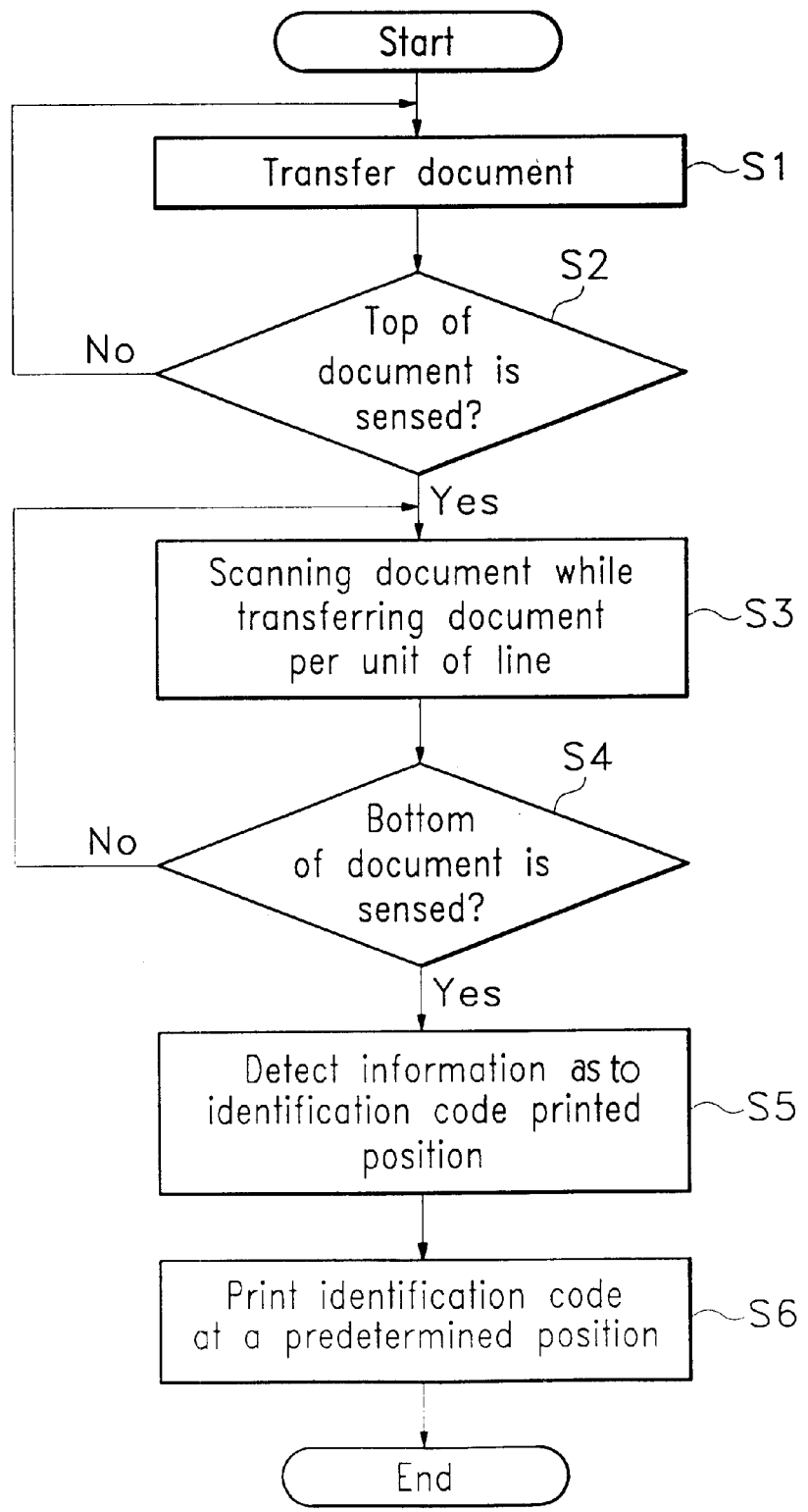
FIG. 4 is a flowchart of a stamp printing method of a multifunctional machine according to an embodiment of the present invention.

FIG. 4 is a flowchart of a stamp printing method of a multifunctional machine according to an embodiment of the present invention. When a scanning function is selected, and it is sensed by a document sensor in the sensing unit 8 that a document is set, the CPU 1 drives a feed motor (not shown) to transfer the document (S1). When the top of the document is sensed by the scanning position sensor in the sensing unit 8 (S2), the CPU 1 controls the feed motor to transfer the document per unit of line and, at the same time, the CPU 1 controls the scanning unit 4 to scan data recorded on the document (S3). When the bottom of the document is sensed by the scanning position sensor (S4), the CPU 1 searches the memory 2 for information as to the identification code printed positions (S5). Initially, the identification code printed position is the left side of the bottom of the document. When all documents have been completely scanned, a count value is increased by one and stored in the memory 2. Accordingly, when documents are subjected to a subsequent scanning process the identification code printed position for those documents is moved by a predetermined distance from the left side toward the right side of the bottom of the document in correspondence to the increased count value. These steps are repeatedly performed with subsequently scanned documents until the identification code printed position arrives at the right side of the bottom of the document. When the identification code printed position is moved to the right side, the count value stored in the memory 2 is initialized again. Accordingly, the identification code printed position is then restarted at the left side of the bottom of the document. Thereafter, the CPU 1 prints the identification code at a predetermined position according to the information as to identification code printed positions retrieved from the memory 2 (S6). After the document is repeatedly scanned, the identification code 'CPLT' is repeatedly printed from the left side of the bottom of the document, as shown in FIG. 5. Accordingly, the user can recognize whether or not the document is scanned according to the position of the last code among the repeatedly printed identification codes.

Figure 6:
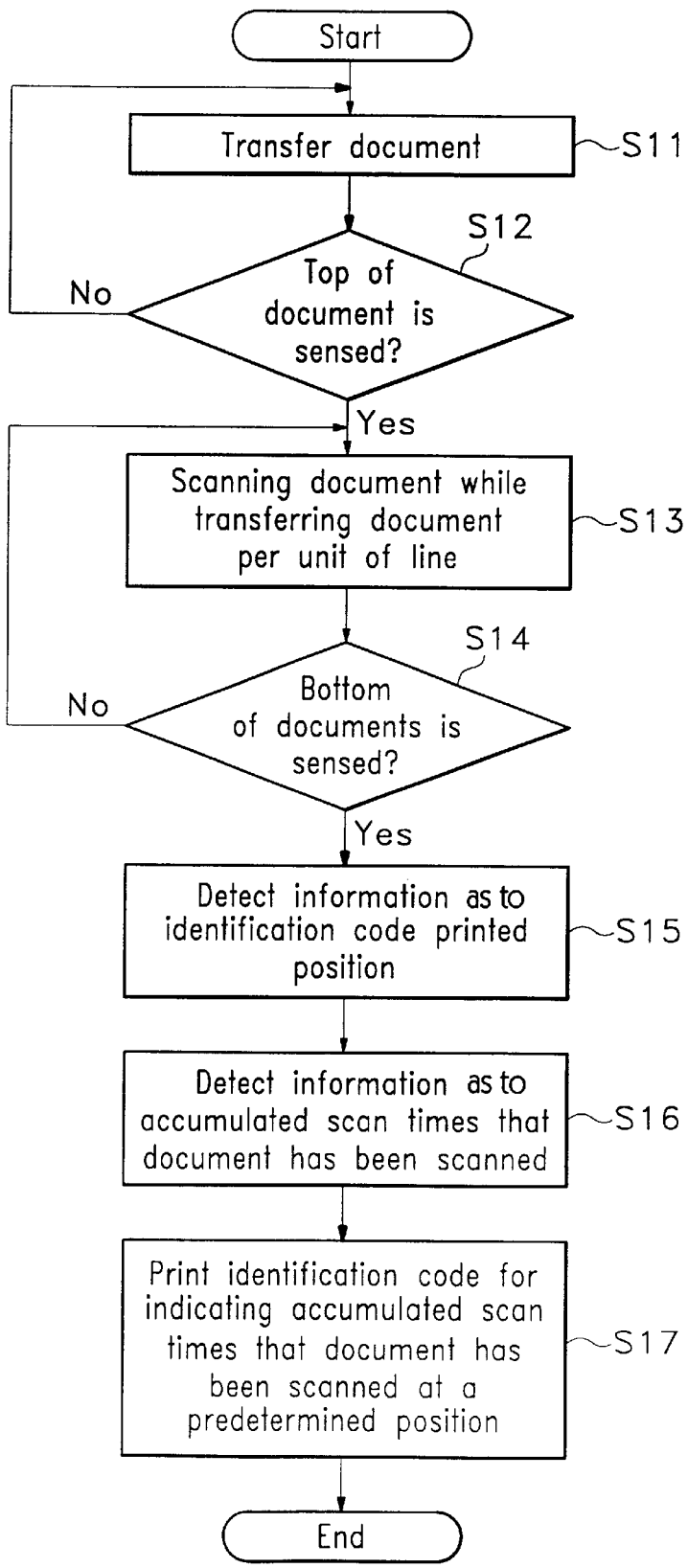
FIG. 6 is a flowchart of a stamp printing method of a multifunctional machine according to another embodiment of the present invention.
Figure 7:
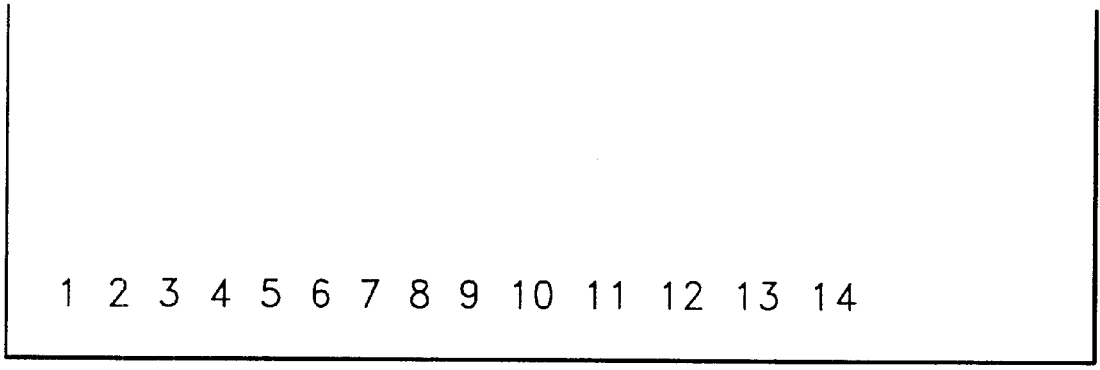
FIG. 7 illustrates identification codes printed by the multifunctional machine of FIG. 6.

FIG. 6 is a flowchart of a stamp printing method of a multifunctional machine according to another embodiment of the present invention. When a scanning function is selected and it is sensed by a document sensor in the sensing unit 8 that a document is set, the CPU 1 drives a feed motor (not shown) to transfer the document (S11). When the top of the document is sensed by the scanning position sensor in the sensing unit 8 (S12), the CPU 1 controls the feed motor to transfer the document per unit of line and, at the same time, the CPU 1 controls the scanning unit 4 to scan data recorded on the document (S13). When the bottom of the document is sensed by the scanning position sensor (S14), the CPU 1 searches the memory 2 for information as to the identification code printed positions (S15) and information as to the number of scan times that the document has been scanned (S16). As aforementioned, an identification code 1 is firstly printed on the left side of the bottom of the document. When all documents have been completely scanned, the count value is increased by one and stored in the memory 2. Accordingly, when documents are subjected to a subsequent scanning process, the identification code printed position for those documents is moved by a predetermined distance from the left side toward the right side of the bottom of the document in correspondence to the increased count value. These steps are repeatedly performed with subsequently scanned documents until the identification code printed position arrives at the right side of the bottom of the document. As a result, numbers from 1 to N (an integer) are successively printed on the bottom of the document. The printed identification code has the same value as the count value. When the identification code printed position is moved to the right side and the identification code is printed at the right side, the count value stored in the memory 2 is initialized again. Accordingly, the identification code printed position is restarted at the left side of the bottom of the document and, at the same time, the number of scan times that the document has been scanned is reset to one. Thereafter, the CPU 1 prints the identification codes according to the information as to the identification code printed position and the information as to the number of times that the document has been scanned is retrieved from the memory 2 (S17). As a result, after the document is repeatedly scanned, the numbers from 1 to N (an integer) are successively printed from the left side of the bottom of the document, as shown in FIG. 7. Accordingly, the user can recognize whether or not the document has been scanned, and can determined the number of times that the document has been scanned according to the position of the last code among the repeatedly printed identification codes.

In the first embodiment of the present invention, the identification code is described as 'CPLT'. The identification code, however, can be other similar codes within the scope of the present invention.

In the second embodiment of the present invention, the identification code indicating the number of times that the document has been scanned is described as an integer of 1 and more than 1. However, the identification code indicating the number of times that the document has been scanned may be other codes (e.g., Roman letter or other letters having numeral concepts).

Therefore, the stamp printing method of a multifunctional machine according to the present invention provides several advantages. First, when a predetermined identification code is printed on a document scanned by a machine having scanning and printing functions, it can be easily checked whether or not the document is scanned by varying the printed position of an identification code according to accumulated scan times that the document is scanned. Particularly, it is very useful to check whether or not the document is skipped or which document is skipped. In addition, when a predetermined identification code is printed on a scanned document, one can easily check whether or not the document is scanned, and the number of times that the document has been scanned by printing different shapes of identification codes which allow determination of the number of times that the document has been scanned.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for printing identification codes that indicate a number of times that a side of a document has been scanned by a scanning and printing system, the method comprising the steps of:

sensing a top of said side of said document;

scanning said data recorded on said side of said document while transferring said document in a predetermined direction;

sensing a bottom of said side of said transferred document;

detecting an identification code printed position corresponding to a stored count value, wherein said stored count value equals the number of times that the side of the document has been previously scanned;

printing said identification code at said detected identification code printed position; and increasing said stored count value by a predetermined value when said scanning of said side of said document is completed and storing said increased count value.

2. The method of claim 1, wherein said document is transferred by a unit of a line.

3. The method of claim 2, wherein said predetermined value is 1.

4. The method of claim 1, wherein said identification code is initially printed on a left side of said bottom of said side of said document when initial scanning of said side of said document is completed, and is subsequently printed at predetermined intervals toward a right side of said bottom of said side of said document as successive scannings of said side of said document are completed and said count value is increased by said predetermined value.

5. The method of claim 4, wherein said predetermined interval is determined based on a consideration that, when said identification code is repeatedly printed on said side of said document, said repeatedly printed identification codes are not overlapped with one another.

6. The method of claim 5, wherein said predetermined value is 1.

7. The method of claim 4, wherein, when said identification code printed position is moved and arrives at said right side of said bottom of said side of said document, said count value is initialized so that said identification code printed position is restarted at said left side said bottom of said side of said document.

8. The method of claim 7, wherein said predetermined value is 1.

9. The method of claim 4, wherein said predetermined value is 1.

10. The method of claim 1, wherein said predetermined value is 1.

11. A method for printing identification codes that indicate a number of times that a side of a document has been scanned by a scanning and printing system, the method comprising the steps of:

sensing a top of said side of said document;

scanning said data recorded on said side of said document while transferring said document in a predetermined direction;

sensing a bottom of said side of said transferred document;

detecting an identification code printed position corresponding to a stored count value, wherein said stored count value equals the number of times that the side of the document has been previously scanned;

detecting the number of times that said document has been scanned based on said stored count value as incremented by a predetermined value in correspondence to completion of a current scan;

setting said number of times that said document has been scanned as said identification code, and printing said identification code on said detected identification code printed position; and increasing said stored count value by the predetermined value when said current scan of said side of said document is completed and storing said increased count value.

12. The method of claim 11, wherein said document is transferred by a unit of a line.

13. The method of claim 11, wherein said identification code is initially printed on a left side of said bottom of said side of said document when initial scanning of said side of said document is completed, and is subsequently printed at predetermined intervals toward a right side of said bottom of said side of said document as successive scannings of said side of said document are completed and said count value is increased by said predetermined value.

14. The method of claim 13, wherein said predetermined interval is determined based on a consideration that, when said identification code is repeatedly printed on said side of said document, said repeatedly printed identification codes are not overlapped with one another.

15. The method of claim 13, wherein, when said identification code printed position is moved and arrives at said right side of said bottom of said side of said document, said count value is initialized so that said identification code printed position is restarted at said left side of said bottom of said side of said document.

16. The method of claim 11, wherein said count value is initially set to zero, and said count value is increased by 1 whenever a scanning of said side of said document is completed.

17. A method for printing identification codes that indicate a number of times that a side of a document has been scanned by a scanning and printing system, the method comprising the steps of:

sensing a top of said side of said document;

scanning said data recorded on said side of said document while transferring said document in a predetermined direction;

sensing a bottom of said side of said transferred document;

detecting an identification code printed position corresponding to a stored count value, wherein said stored count value equals the number of times that the side of the document has been previously scanned; and printing said identification code at said detected identification code printed position;

wherein, each time said side of said document is scanned, said identification code is printed at a different identification code printed position as determined by said stored count value.

18. The method of claim 17, further comprising the step of increasing said stored count value by a predetermined value each time said side of said document is scanned, and storing said increased count value.

19. The method of claim 18, wherein said identification code is initially printed on a left side of said bottom of said document when initial scanning of said side of said document is completed, and is subsequently printed at predetermined intervals toward a right side of said bottom of said side of said document as successive scannings of said side of said document are completed and said count value is increased by said predetermined value.

20. The method of claim 19, wherein said predetermined interval is determined based on a consideration that, when said identification code is repeatedly printed on said side of said document, said repeatedly printed identification codes are not overlapped with one another.

21. The method of claim 19, wherein, when said identification code is printed at said right side of said bottom of said side of said document, said count value is initialized so that said identification code printed position is restarted at said left side of said bottom of said side of said document.

22. A method for printing identification codes that indicate a number of times that a side of a document has been scanned by a scanning and printing system, the method comprising the steps of:

sensing a top of said side of said document;

scanning said data recorded on said side of said document while transferring said document in a predetermined direction;

sensing a bottom of said side of said transferred document;

detecting an identification code printed position corresponding to a stored count value, wherein said stored count value equals the number of times that the side of the document has been previously scanned;

detecting a number of times that said document has been scanned based on said stored count value as incremented by a predetermined value in correspondence to completion of a current scan;

setting said number oftimes that said document has been scanned as said identification code; and printing said identification code on said detected identification code printed position.

23. The method of claim 22, further comprising the step of increasing said stored count value by the predetermined value and storing said increased count value each time a scanning of said document is completed.

24. The method of claim 23, wherein said identification code is initially printed on a left side of said bottom of said side of said document when initial scanning of said side of said document is completed, and is subsequently printed at predetermined intervals toward a right side of said bottom of said side of said document as successive scannings of said side of said document are completed and said count value is increased by said predetermined value.

25. The method of claim 24, wherein said predetermined interval is determined based on a consideration that, when said identification code is repeatedly printed on said side of said document, said repeatedly printed identification codes are not overlapped with one another.

26. The method of claim 24, wherein, when said identification code is printed at said right side of said bottom of said side of said document, said count value is initialized so that said identification code printed position is restarted at said left side of said bottom of said side of said document.

27. The method of claim 23, wherein said count value is initially set to zero, and said count value is increased by 1 whenever a scanning of said document is completed.

* * * * *